United States Patent [19]

Misev et al.

[11] Patent Number: 5,763,099
[45] Date of Patent: Jun. 9, 1998

[54] BINDER COMPOSITION FOR POWDER COATINGS

[75] Inventors: Tosko A. Misev; Eimbert G. Belder; Fokeltje A. Koldijk, all of Zwolle, Netherlands

[73] Assignee: DSM N.V., Heerlen, Netherlands

[21] Appl. No.: 643,978

[22] Filed: May 7, 1996

Related U.S. Application Data

[63] Continuation of Ser. No. 302,867, filed as PCT/EP93/00635, Mar. 15, 1993, published as WO93/19132, Sep. 30, 1993.

[30] Foreign Application Priority Data

Mar. 19, 1992 [NL] Netherlands ............... 9200506

[51] Int. Cl.$^6$ ............................................. C08L 67/06
[52] U.S. Cl. ............................ 428/482; 525/42; 525/44; 525/934; 522/107
[58] Field of Search ............... 525/42, 44, 934; 522/107; 428/482

[56] References Cited

U.S. PATENT DOCUMENTS

| | | |
|---|---|---|
| 3,373,160 | 3/1968 | Ikeda ........................................ 525/44 |
| 3,396,063 | 8/1968 | Massoubre . |
| 4,001,153 | 1/1977 | Ogino et al. . |
| 4,107,012 | 8/1978 | Fuhr et al. . |
| 4,134,884 | 1/1979 | Takiyama et al. . |
| 5,064,892 | 11/1991 | Hofland et al. . |

FOREIGN PATENT DOCUMENTS

| | | |
|---|---|---|
| A-0305006 | 3/1989 | European Pat. Off. . |
| A-2183053 | 12/1973 | France . |
| A12659434 | 7/1977 | Germany . |
| A-2742270 | 1/1979 | Germany . |
| 2742270 | 3/1979 | Germany . |
| 6400496 | 1/1964 | Netherlands . |

*Primary Examiner*—Patricia A. Short
*Attorney, Agent, or Firm*—Pillsbury Madison & Sutro LLP, Cushman, Darby & Cushman Intellectual Property Group

[57] ABSTRACT

The invention relates to a binder composition for powder coatings. The binder composition is substantially based on a mixture of an unsaturated polyester and an oligomer having a plurality of allyl groups and further having at least either ether and ester groups or urethane and optionally ether groups.

The oligmer is preferably an allyl ether ester being more preferably the ester of trimethylolpropane diallyl ether or pentaerythritol triallyl ether and a polycarboxylic acid (anhydride).

17 Claims, No Drawings

BINDER COMPOSITION FOR POWDER COATINGS

This is a continuation of application No. 08/302,867, filed as PCT/EP93/00635, Mar. 15, 1993, published as WO93/19132, Sep. 30, 1993, which was abandoned upon the filing hereof.

The invention relates to a binder composition for powder coatings and to a process for the preparation of this composition.

As appears from the article "Powder Coatings in Europe" by Morandini (Pitture e Vernice 9/88, page 70), powder coating binder compositions are sought which permit polymerisation or curing at lower temperatures, for example in 10–30 minutes at 130° C.

The object of the invention is to provide such a binder composition.

This object is achieved in that the binder composition is substantially based on a mixture of an unsaturated polyester and an oligomer having 2–12 allylether groups and further having ester groups or urethane groups.

This gives a composition which permits both hardening of the coating at higher temperatures, for example between 160° C. and 240° C., for example over 3–15 minutes, and hardening at lower temperatures, for example between 110° C. and 160° C. over 10–30 minutes.

The glass transition temperature of the composition preferably is at least 10° C. and more preferably at least 20° C..

In DE-A-2742270 a fluid composition is described based on 50–60 wt % unsaturated polyester and 40–50 wt % allylethergroups containing compounds. This reference does not contain any indication that solid compositions could be made that are suitable as powder coating and that exhibit good mechanical properties combined with good acetoneresistance.

The binder composition combines the property of being low temperature curable, with other desired coating properties such as, for example, hardness, flow, color stability, scratch resistance and excellent drying properties.

Preferably the compound has at least 4 allyl groups.

Preferably, the compound having allyl groups has a molecular weight higher than 200, more preferably higher than 300. Preferably, the compound has a molecular weight lower than 1700, preferably lower than 1200.

Preferably, the compound having allyl groups has a molecular weight per allyl group lower than 350, more preferably lower than 200. As a rule, the molecular weight per allyl group is about 100 or higher.

According to a preferred embodiment of the invention the oligomer is an allyl ether-ester, more preferably being the ester of trimethylolpropane diallyl ether or pentaerythritol triallyl ether and a polycarboxylic acid (anhydride).

Suitable polycarboxylic acids and polycarboxylic acid anhydrides are, for example, trimellitic acid (anhydride), isophthalic acid, adipic acid, phthalic acid (anhydride), cyclohexanedicarboxylic acid, tetrahydrophthalic acid (anhydride) and hexahydrophthalic acid (anhydride). Preferably, trimellitic acid (anhydride), isophthalic acid, adipic acid and/or 1,4-cyclohexanedicarboxylic acid is used as the polycarboxylic acid (anhydride).

The oligomer can be either liquid or solid compounds. Preferably, liquid compounds are employed.

The allyl ether groups containing ester can be prepared by carrying out a condensation reaction between a polycarboxylic acid (anhydride) and an allyl ether alcohol at temperatures between, for example, 150° C. and 200° C., over, for example, between 3 and 6 hours. The molar ratio of allyl ether alcohol:polycarboxylic acid (anhydride) is preferably between about 1:1 and 4:1.

Preferably, the allyl ether ester is the trimethylolpropane diallyl ether diester and triester of trimellitic acid anhydride or the pentaerythritol triallyl ether diester of adipic acid.

The preparation of the oligomers containing allyl groups and urethane groups may be carried out by adding the compounds containing allyl groups to compounds containing isocyanate groups at temperatures between 70° C. and 120° C. A suitable solvent for this reaction is, for example, toluene. The solvent is removed after the reaction.

Suitable oligomers containing allyl groups and urethane groups may be based on compounds containing allyl groups such as, for example, allyl alcohol, trimethylolpropane diallyl ether, allyl glycidyl ethers and pentaerythritol triallyl ether. Examples of suitable isocyanates are isophorone diisocyanate, toluene diisocyanate, hexamethylene diisocyanate and methylene biscyclohexylisocyanate.

The binder composition according to the invention is preferably prepared by mixing the unsaturated polyester and the oligomer having a plurality of allyl groups in a ratio such that 1–50 equivalents of unsaturation derived from the allyl groups are mixed with 50–99 equivalents of unsaturation derived from the unsaturated polyester (the total equivalents of unsaturation being 100).

The amount of allyl group containing compounds usually is lower than 25 wt % relative to polyester plus allyl group containing compound, preferably lower than 20 wt % and more preferably lower than 15 wt %.

According to a further preferred embodiment of the invention, 80–95 equivalents of unsaturation of the unsaturated polyester are mixed with 5–20 equivalents of unsaturation of the allyl groups.

An unsaturation equivalent weight is the number of grams of unsaturated polyester, allyl ether (ester) or isocyanate containing allyl groups, which contains one unsaturated group (WPU).

The mixing may be carried out in, for example, an extruder or a kneader, with the temperatures mostly being between 70° C. and 130° C.

As catalysts, metal compounds based on a fatty acid or oil may be added to the mixture. Examples of suitable metals are cobalt, manganese, lead, copper and/or vanadium. Preferably, cobalt-containing compounds, for example cobalt octoate, are used. Such compounds, if used, are preferably employed in amounts of less than 0.5% by weight relative to the binder composition. Amines, such as for example dimethylaniline, may also be used as the catalyst.

As initiator, peroxides, having a decomposition temperature of between 70° C. and 180° C., can be added to the mixture in amounts which are preferably between 0.1 and 5% by weight.

Examples of such peroxides are alkyl peroxides, acyl peroxides and peroxydicarbonates, such as dilauryl peroxides, tertiary butyl peroxybenzoate, dicumyl peroxide and 1,1-bis-(tert.-butylperoxy)-3,3,5-trimethyl-cyclohexane.

A suitable binder composition comprises, for example:
a) unsaturated polyester,
b) oligomer having a plurality of allylether groups and having further ester or urethane groups,
c) 0–0.5% by weight (relative to a) and b)) of metal catalyst and
d) 0.1–5% by weight (relative to a) and b)) of an initiator, the ratio of the unsaturated groups of the polyester to the unsaturated groups of the allyl ether ester being between 50–99 equivalents:1–50 equivalents.

According to another preferred embodiment of the invention, this ratio is between 70–98 equivalents:2–30 equivalents.

According to a preferred embodiment of the invention, the binder composition essentially consists of the above components. Examples of other compounds which may be added to the system are flow agents, pigments and inhibitors.

The polyester preparation may be carried out in two stages, in which case, in the first stage, saturated acids and glycols are esterified at 230°–260° C. for 2–10 hours, and in the second stage the unsaturated compounds and/or saturated acids and glycols are esterified at 180°–220° C. for 5–16 hours.

The unsaturated polyester is in general composed of one or more aliphatic and/or cycloaliphatic, monohydric, dihydric and/or polyhydric alcohols and one or more aliphatic, cycloaliphatic and/or aromatic dicarboxylic or polycarboxylic acids and, if desired, monocarboxylic acids and/or esters derived therefrom. As examples of suitable alcohols, there may be mentioned benzyl alcohol, ethylene glycol, propylene glycol, neopentyl glycol, butanediol, hexanediol, dimethylolcyclohexane, diethylene glycol, glycerol, trimethylol-propane, pentaerythritol and/or dipentaerythritol. Instead of or in addition to the alcohol compound or compounds, one or more epoxy compounds may be used, such as, for example, ethylene oxide, propylene oxide and/or allyl glycidyl ether. Examples of suitable dicarboxylic or polycarboxylic acids are maleic acid, fumaric acid, itaconic acid, citraconic acid, malonic acid, succinic acid, glutaric acid, adipic acid, sebacic acid, 1,4-cyclohexanedicarboxylic acid, hexahydrophthalic acid, hexachloroendomethylenetetrahydrophthalic acid, dichlorophthalic acid, isophthalic acid, terephthalic acid and/or trimellitic acid. The carboxylic acid can also be used in the form of an anhydride, for example tetrahydrophthalic anhydride, maleic anhydride or phthalic anhydride.

Frequently, fumaric acid in combination with isophthalic acid and/or terephthalic acid is used as the dicarboxylic acid component. If desired, the unsaturated polyester can also contain saturated or unsaturated monocarboxylic acids such as synthetic and/or natural fatty acids with from 2 to 36 carbon atoms or esters prepared from these carboxylic acids and polyhydric alcohols, such as glycerol. Examples of suitable mono- carboxylic acids are lauric acid, stearic acid, oleic acid, linoleic acid, benzoic acid, acrylic acid and/or methacrylic acid. The unsaturated polyester can also be based on dicyclopentadiene.

The unsaturated polyester can be either crystalline or amorphous. Amorphous unsaturated polyesters suitable for application in the composition according to the invention have a glass transition temperature of at least 20° C. and preferably over 25° C. Suitable crystalline polyesters have a melting point of at least 50° C. Melting points and glass transition temperatures are measured with a Mettler 3000 DSC-apparatus at a scanning speed of 5° C./min. Because it is easier to synthesise crystalline polyesters, these are preferred.

The amount of unsaturation in the unsaturated polyester is mostly between 200 and 1300 grams per unsaturated group (WPU).

The molecular weight $M_n$ is mostly between 1000 and 6000, preferably between 2500 and 4500.

Acid-functional polyesters mostly have an acid number of between 18 mg of KOH/gram of resin and 75 mg of KOH/gram of resin, preferably an acid number of between 25 mg of KOH/gram of resin and 45 mg of KOH/gram of resin.

Hydroxyl-functional polyesters mostly have a hydroxyl number of between 18 mg of KOH/gram of resin and 75 mg of KOH/gram of resin, preferably a hydroxyl number of between 25 mg of KOH/gram of resin and 45 mg of KOH/gram of resin.

Powder coatings have gained considerably in popularity over the last decade, as a result of the environmental friendliness, convenience of use and good quality of such coatings.

The polyester resins are mixed at a temperature of between about 70° C. and 130° C., for example by extrusion, with an allyl ether ester and/or an isocyanate containing allyl groups, the pigments and the other additives. After having been sprayed on electrostatically, they are cured. The usual initiators can be employed. Depending on the initiator used the composition is cured by the application of heat and/or radiation, preferably UV-radiation. Prefered using temperatures are between 110° C. and 240° C. During the curing process, the powder melts and subsequently flows to form a smooth, continuous coating film, after which the hardening reaction proceeds smoothly.

The system is very suitable for curing by means of UV curing, for which conventional UV irradiation sources and photoinitiators for example, benzoine derivates, peroxides, benzylketales and acetophenone derivates, may be employed.

Conventional additives such as, for example, pigments, fillers, flow agents and stabilisers can be added to the binder system.

Examples of suitable pigments are inorganic pigments, such as titanium dioxide, zinc sulphide, iron oxide and chromium oxide, and organic pigments such as azo compounds.

Examples of suitable fillers are metal oxides, silicates, carbonates and sulphates.

Substrates which may be chosen are, for example, plastic, wood, glass and metal.

U.S. Pat. No. 4,001,153 describes resin compositions which contain unsaturated polyesters based on tetrahydrophthalic acid and/or fatty acid, and at least 30 mol % of a glycol containing cycloalkylene groups or phenylene groups. These polyesters may, in addition to conventional polyol components, also contain 10–70% by weight of allyl ether polyols such as, for example, diallyl ethers of trimethylolpropane and allyl ethers of pentaerythritol built into the structure. The unsaturated polyester must, furthermore, be mixed with a solid vinyl or allylester compound in order to be able to serve as the basis of powder coatings. U.S. Pat. No. 4,001,153 does not describe the use of allylether esters nor allylurethanes. Furthermore, coatings made according this reference will be not acceptable in acetone resistance.

According to U.S. Pat. No. 4,134,884, it is possible to make a powder coating with an unsaturated polyester and an α,β-ethylenically unsaturated acetal. These compounds have at disadvantage, e.g., that much of such an acetal is needed to obtain acceptable mechanical properties.

The invention is illustrated with reference to the Examples which follow, without being restricted thereto.

EXAMPLES

Experiment A

Preparation of the unsaturated polyester

A 3 liter reactor vessel having a thermometer, stirrer and a distillation device was filled with 2.5 mol (154 g) of ethylene glycol, 5.2 mol (614 g) of 1,6-hexanediol, 6.7 mol (1119 g) of terephthalic acid and 0.05% by weight of dibutyl-tin oxide. Thereafter, whilst introducing a stream of nitrogen for 6 hours, the temperature was raised to 245° C. while water was distilled off. When an acid number of 5–6 mg of KOH/g of resin had been reached, the mixture was cooled to 160° C. Thereafter, 2.9 mol (346 g) of 1,6-hexanediol and 2.9 mol (340 g) of fumaric acid were added. The temperature was subsequently raised over 5 hours to 205° C. When an acid number of 10 16 mg of KOH/g of resin had been reached, the mixture was cooled to 180° C. and vacuum was applied for 1 hour.

The polyester obtained was characterised by the following:
Acid number: 12 mg of KOH/gram of resin
Hydroxyl number: 31 mg of KOH/gram of resin
Viscosity: 21 dPas (Emila, 165° C.) and
Melting range: 60° C.–100° C. (Mettler, TA 3000, 5° C./min).

Experiment B

Preparation of allyl ether ester

A 1 liter reactor vessel having a thermometer, stirrer and distillation attachment was filled with 1.2 mol (230 g) of trimellitic acid anhydride and 2.5 mol (539 g) of trimethylolpropane diallyl ether. Thereafter the temperature was raised to 185° C. whilst introducing a stream of nitrogen, and at the same time water was distilled off. When an acid number of 82–85 mg of KOH/g of resin had been reached, the mixture was cooled to 175° C., after which vacuum was applied for 30 minutes.

The end product had the following properties:
Viscosity: 166 dPas (Emila, 23° C.) and
Acid number: 75.5 mg of KOH/gram of resin.

Example I

Preparation of powder coating

A kneader was filled at 100° C. with 586 g of resin according to Experiment A, 14 g of allyl ether ester according to Experiment B, 5 g of BYK 361R (acrylate copolymer as flow agent) and 4.5 g of benzoin (degassing agent). Thereafter the mixture was cooled to 70° C. and 5 g of Co solution (6% Co) and 12 grams of peroxide (Triganox 29B50$^R$, 1,1-bis-(tert.-butyl peroxide)-3,5,5-trimethylcyclohexane) were added, after which the mixture was ground and sieved (<90μm). The powder coating was then electrostatically applied in a thickness of approximately 50 μm to a steel plate and cured for 20 minutes at 125° C. in a circulatory oven.

The properties of the powder coating obtained were:

| Flow | good (determined visually) |
|---|---|
| Appearance | good (determined visually) |
| Scratch resistance | good |
| Acetone resistance | >100 dr[1] |
| Impact resistance | 160 inch-pounds (1.84 kg · m) (ASTM-D2794-69) |
| Impact resistance after 1 day | 160 inch-pounds (1.84 kg · m) (ASTM-D2794-69) |

[1] dr = double rubs

The acetone resistance is determined by rubbing to and fro (double rub) a cotton swab soaked with aceton about the surface of a coating until the surface becomes soft or matt. A surface standing 100 double rubs is considered to possess a good aceton resistance.

It may be concluded from this that the binder composition based on unsaturated polyester and allyl ester resulted in a powder coating which could be cured in 20 minutes at 125° C., giving good coating properties.

In contrast coatings with an equivalent amount (with respect to the allylgroups) of the diallylether of trimethylolpropane, or triallylcyanurate or diallyl- phthalate gave coatings with an acetone resistance lower than 2 double rubs.

Experiment C

A 3 liter reactor vessel having a thermometer, stirrer and distillation device was filled with 3.9 mol (410.1 g) of neopentyl glycol, 3.4 mol (563.1 g) of terephthalic acid and 0.05% by weight of dibutyl-tin oxide. Thereafter, whilst introducing a stream of nitrogen for 6 hours, the temperature was raised to 245° C. while water was distilled off. When an acid number of 2 mg of KOH/g of resin had been reached, the mixture was cooled to 160° C. Thereafter 7.3 mol (762.4 g) of neopentyl glycol and 7.3 mol (850.5 g) of fumaric acid were added. The temperature was then raised to 205° C. over 10 hours. At an acid number of 18 mg of KOH/g of resin, the mixture was cooled to 180° C. and vacuum was applied for 1 hour.

The polyester obtained was characterised by the following:

| Acid number: | 17 mg of KOH/g of resin |
|---|---|
| Hydroxyl number: | 23 mg of KOH/g of resin |
| Viscosity: | 95 dPas (Emila, 165° C.) |
| Glass transition temperature: | 30° C. (Mettler TA 3000, 5° C./min) |

Example II

Preparation of powder coating

A kneader was filled at 100° C. with 568 g of resin according to Experiment C, 32 g of allyl ether ester according to Experiment B, 5 g of BYK 361R (flow agent), 4.5 g of benzoin (degassing agent) and 12 g of hydroxy- cyclohexylacetophenone (Irgacure 184R). The mixture was ground and sieved (<90 pm). The powder coating was applied electrostatically, in a thickness of approximately 50 pm, to a steel panel and a wooden panel (MFD, medium fibber density). The powder coating was heated at a temperature <120° C. by means of infrared lamps until a smooth film was obtained (approx. 2 min.). The coating was then irradiated with ultraviolet light (2.5 J/cm$^2$).

The properties of the powder coating obtained were:

| Steel: | |
|---|---|
| Flow | good (visual) |
| Appearance | good (visual) |
| Slow penetration | 7.5 mm (Erichsen, ISO 1520) |
| Acetone resistance | >100 dr |
| Wood: | |
| Flow | good (visual) |
| Appearance | good (visual) |
| Acetone resistance | >100 dr |
| Cold check, 100 cycles | good (D1211-74, with 1 cycle comprising 1 hour, 50° C./1 hour, −20° C./20 min, 20° C.) |
| Acetone resistance after cold check | >100 dr |

From this it may be concluded that the binder composition based on unsaturated polyester and allyl ether ester gave a powder coating which can be cured with ultraviolet light, giving good coating properties.

Comparable good properties were obtained with a coating comprising an equivalent amount of the addition product of trimethylolpropane-diallylether to isophorondiisocyanate (about 80 double rubs in acetone resistance). Also the oligomer based on the esterified product of one mole isophthalic acid and two moles neopentylglycol, reacted with two moles isophorondiisocyanate and thereafter reacted with two moles trimethylolpropane-diallylether gave a coating with good properties (~100 acetone double rubs).

We claim:

1. A binder composition for powder coatings consisting essentially of a mixture of an unsaturated polyester, an oligomer having 4–12 allylether groups and further having ester groups, and optionally 0–0.5% by weight relative to said polyester and said oligomer, of a metal-containing catalyst and 0.1–5% by weight relative to said polyester and said oligomer, of an initiator, and wherein the ratio of the unsaturated grous of the polyester to the unsaturated groups of the allyl ether ester is between 50–99 equivalents:1–50 equivalents.

2. A binder composition according to claim 1, wherein said oligomer is an ester of a polycarboxylic acid or anhydride and either trimethylolpropane diallyl ether or pentaerythritol triallyl ether.

3. A binder composition according to claim 1, wherein said oligomer is an ester of a polycarboxylic acid or anhydride and either trimethylolpropane diallyl ether or pentaerythritol triallyl ether.

4. A process for preparing a binder composition according to claim 1 which comprises mixing said polyester and said oligomer in a mixing ratio such that 1–50 equivalents of unsaturation are derived from said oligomer and 50–99 equivalents of unsaturation are derived from said polyester and wherein the total equivalents of unsaturation is 100.

5. A binder composition according to claim 1, wherein said oligomer has a molecular weight less than 1700, and a molecular weight per allyl group of less than 350, and said binder composition has a glass transition temperature of at least 10° C.

6. A binder composition according to claim 1, wherein said oligomer has a molecular weight less than 1700, and a molecular weight per allyl group of less than 350, and said binder composition has a glass transition temperature of at least 10° C.

7. A binder composition according to claim 1 wherein said oligomer has a molecular weight less than 1700, and a molecular weight of less than 350 per allylether group.

8. A binder composition according to claim 1, wherein said oligomer has a molecular weight less than 1700, and a molecular weight of less than 350 per allylether group.

9. A binder composition for powder coatings consisting essentially of a mixture of an unsaturated polyester and an oligomer having allylether groups and further having ester groups, wherein the oligomer having said allylether groups and ester groups has 4–12 allylether groups, said oligomer being obtained by condensing a polycarboxylic acid or anhydride with an allyl ether alcohol.

10. A binder composition according to claim 9 wherein said binder composition consists essentially of said unsaturated polyester;

said oligomer;

0–0.5% by weight, relative to said polyester and said oligomer, of a metal- containing catalyst; and 0.1–5% by weight, relative to said polyester and said oligomer, of an initiator, and wherein the ratio of the unsaturated groups of the polyester to the unsaturated groups of the allyl ether is between 50–99 equivalents:1–50 equivalents.

11. A binder composition according claim 10 wherein said initiator is a photoinitiator.

12. A binder composition according to claim 10, wherein the metal in the metal containing catalyst is at least one selected from the group consisting of cobalt, manganese, lead, copper and vanadium.

13. A binder composition according to claim 10, wherein said initiator is a peroxide.

14. A substrate at least partially coated with a coating, said coating being based on a powder coating composition consisting essentially of a binder composition according to claim 10.

15. A binder composition according to claim 12, wherein said polycarboxylic acid or anhydride are condensed with an allylether alcohol at an allylether alcohol to polycarboxylic acid or anhydride molar ratio of 1:1 to 4:1.

16. A powder coating composition consisting essentially of a binder composition according to claim 1 or 9.

17. A substrate at least partially coated with a coating, said coating being based on a powder coating composition consisting essentially of a binder composition according to claim 1 or 9.

* * * * *